(12) United States Patent
Kozlowski et al.

(10) Patent No.: US 7,775,705 B2
(45) Date of Patent: Aug. 17, 2010

(54) SWITCH ASSEMBLY FOR A FOOD MIXING MACHINE

(75) Inventors: Eugene J. Kozlowski, Medina, OH (US); Jonathan M. Katz, Solon, OH (US); Fred H. Mehlman, Brunswick, OH (US); Glenn F. Brasdovich, Olmsted Township, OH (US)

(73) Assignee: Vita-Mix Corporation, Cleveland, OH (US)

( * ) Notice: Subject to any disclaimer, the term of this patent is extended or adjusted under 35 U.S.C. 154(b) by 1039 days.

(21) Appl. No.: 11/483,286

(22) Filed: Jul. 10, 2006

(65) Prior Publication Data

US 2008/0008026 A1    Jan. 10, 2008

(51) Int. Cl.
    A47J 43/044    (2006.01)
(52) U.S. Cl. ...................................... 366/206
(58) Field of Classification Search ............... 366/197, 366/206
    See application file for complete search history.

(56) References Cited

U.S. PATENT DOCUMENTS

| | | | | | |
|---|---|---|---|---|---|
| 1,057,024 | A | * | 3/1913 | Wood | 366/206 |
| 1,082,243 | A | * | 12/1913 | Shelton | 366/206 |
| 1,537,076 | A | * | 5/1925 | Gilchrist | 366/206 |
| 1,579,590 | A | * | 4/1926 | Beach | 366/206 |
| 1,697,515 | A | * | 1/1929 | Ruetz | 366/206 |
| 1,700,730 | A | * | 1/1929 | Gilchris | 366/206 |
| 2,498,570 | A | * | 2/1950 | Myers | 366/206 |
| 5,211,471 | A | * | 5/1993 | Rohrs | 362/206 |

* cited by examiner

*Primary Examiner*—David L Sorkin
(74) *Attorney, Agent, or Firm*—Renner, Kenner, Greive, Bobak, Taylor & Weber

(57) ABSTRACT

A machine (10) for mixing food in a cup (C) includes a housing having an agitator assembly (15) extending downwardly therefrom and adapted to be rotated by a motor to mix food in the cup (C). A switch assembly (20) is provided to operate the agitator assembly (15). The switch assembly (20) includes a bracket (21) which pivotally carries a plate (41) which extends downwardly adjacent to the agitator assembly (15). A switch (31) is carried by the bracket (21) and has an arm (36) biased toward the plate (41). The plate (41) is biased toward the arm (36) by springs (50) to maintain the switch (31) in the open position. Pivoting the plate (41) relative to the bracket (21) against the bias of the springs (50) allows the arm (36) of the switch (31) to pivot to close the switch (31) allowing the agitator assembly (15) to rotate. Releasing the plate (41) allows the springs (50) to bias the plate (41) against the arm (36) but a pad (55) silences any noise created thereby, and a wall (28) of the bracket (21) stops the plate (41) from exerting undue pressure on the arm (36).

14 Claims, 4 Drawing Sheets

SWITCH ASSEMBLY FOR A FOOD MIXING MACHINE

TECHNICAL FIELD

This invention relates to a switch assembly for operating an agitator in a food mixing machine. More particularly, this invention relates to a switch which is carried by a bracket and activated by a pivotable paddle to rotate an agitator to mix foods in a cup.

BACKGROUND ART

Machines which use a rotatable agitator to mix food products in a cup are well known. Such machines are often found in fast food establishments and can be used by an employee or could be used on a self-serve basis by the customer. The machines include a downwardly depending rotatable agitator, and the user typically fills his cup with food products such as ice cream, candy condiments, and the like, and positions the agitator in the cup by lifting the cup around the agitator. Then the machine is turned on and the agitator rotates to blend the contents of the cup. However, the step of turning on the machine usually requires the manual displacement of a switch with one hand while the other hand holds the cup in the proper position, which is not always convenient to the user since he may not have a free hand to operate the switch.

Attempts to automate the switching process have, for the most part, been unsuccessful in that they are noisy, they can cause damage to the switch mechanism itself, and they do not allow facile replacement of the switch when necessary.

DISCLOSURE OF THE INVENTION

It is thus an object of the present invention to provide a machine for mixing food in a cup, the machine having a switch assembly that can be activated by movement of the hand that is carrying the cup.

It is another object of the present invention to provide a food mixing machine, as above, in which the switch assembly includes a bracket which carries the switch in such a manner so as to prevent damage to the switch.

It is a further object of the present invention to provide a food mixing machine, as above, wherein the switch assembly operates quietly and efficiently.

These and other objects of the present invention, as well as the advantages thereof over existing prior art forms, which will become apparent from the description to follow, are accomplished by the improvements hereinafter described and claimed.

In general, in accordance with one aspect of the present invention, a machine for mixing food in a cup includes a housing and an agitator assembly depending downwardly from the housing and adapted to be rotated to mix food when the agitator is positioned in the cup. A switch assembly includes a bracket positioned in the housing and a plate pivotally carried by the bracket. The plate extends downwardly adjacent to the agitator. A switch is carried by the bracket and is movable between open and closed positions such that when in the closed position, the agitator assembly can be rotated. The plate engages the switch so that when the plate is pivoted, the switch will move from the open to the closed position.

In accordance with another aspect of the present invention, a switch assembly for activating an agitator in a food mixing machine includes a bracket carrying a switch. The switch has an arm biased so that the switch is normally in the closed position. A plate is pivotally carried by the bracket and is biased to normally engage the arm to maintain the switch in the open position against the bias of the switch. When the plate is pivoted relative to the bracket, the bias on the switch arm is allowed to move the arm to close the switch.

A preferred exemplary food mixing machine having a switch assembly made according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
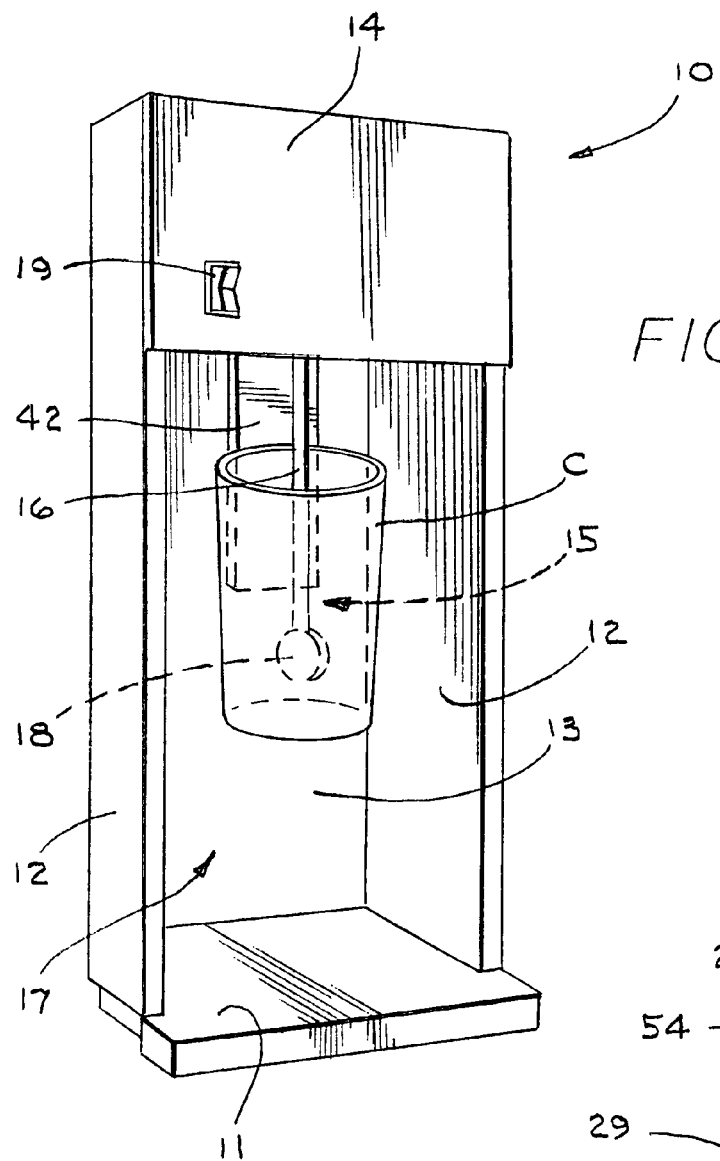
FIG. 1 is a perspective view of a food mixing machine having the switch assembly of the present invention.

A food mixing machine which forms an environment for the present invention is somewhat schematically shown in FIG. 1 and generally indicated by the numeral 10. Machine 10 includes a base 11 having opposed sidewalls 12 interconnected by a rear wall 13, walls 12 and 13 extending upwardly from base 11. A front panel 14 forms, with walls 12 and 13, a housing. A motor and other controls (not shown) are positioned in the housing, and an agitator, generally indicated by the numeral 15, has a stem 16 which is connected to the motor and extends downwardly into a mixing chamber generally indicated by the numeral 17. An agitator blade 18, which can be of any suitable configuration as is known to one skilled in the art, is formed at the bottom of stem 16. An on-off switch 19 may be provided on front panel 14 to provide electrical power to a switch assembly shown in FIGS. 3 and 4 and generally indicated by the numeral 20.

Figure 2:
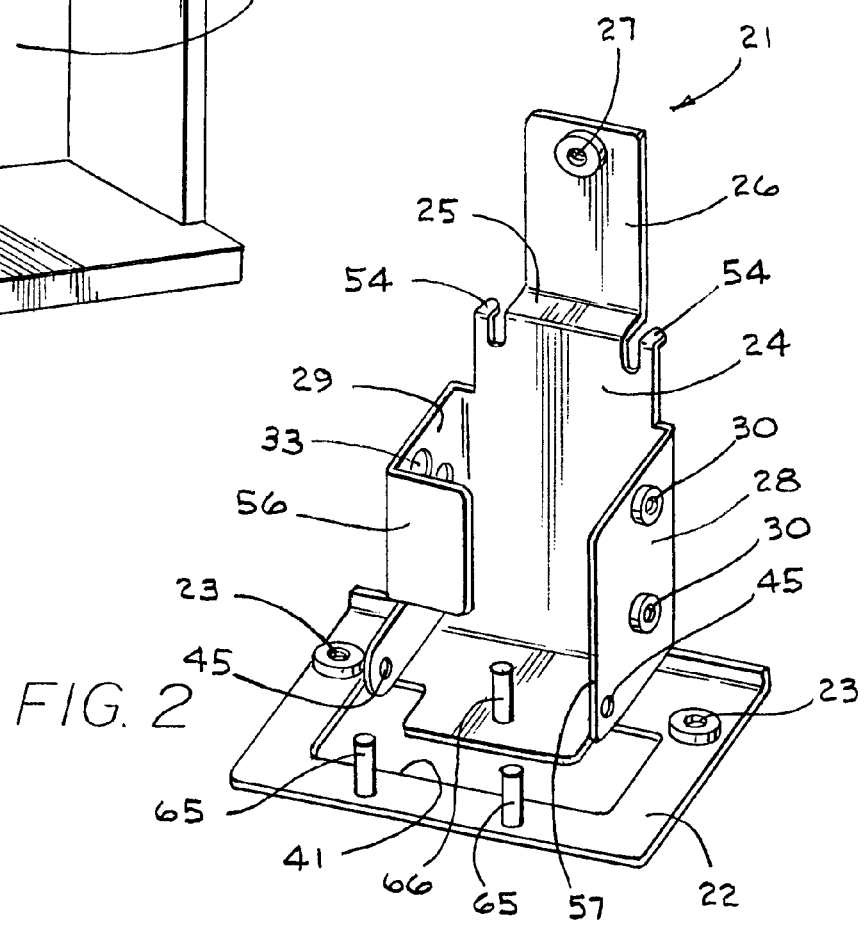
FIG. 2 is a perspective view of the bracket of the switch assembly of the present invention.

One of the components of the switch assembly 20 of the present invention is a bracket generally indicated by the numeral 21 and best shown in FIG. 2. Bracket 21 carries the other components of switch assembly 20 and includes a base plate 22 having apertures 23 near each end thereof. A lower back wall 24 extends upwardly from generally centrally of base plate 22 and terminates as a step 25 to an upper back wall 26. Upper back wall 26 is provided with an aperture 27 which allows bracket 21 to be mounted to rear wall 13 of machine 10, as by a bolt, screw or the like (not shown). Similarly, a horizontal mounting plate (not shown) may extend between sidewalls 12 within the housing, and apertures 23 allow bracket 21 to be mounted to that plate, as by bolts, screws or the like (not shown).

Figure 3:
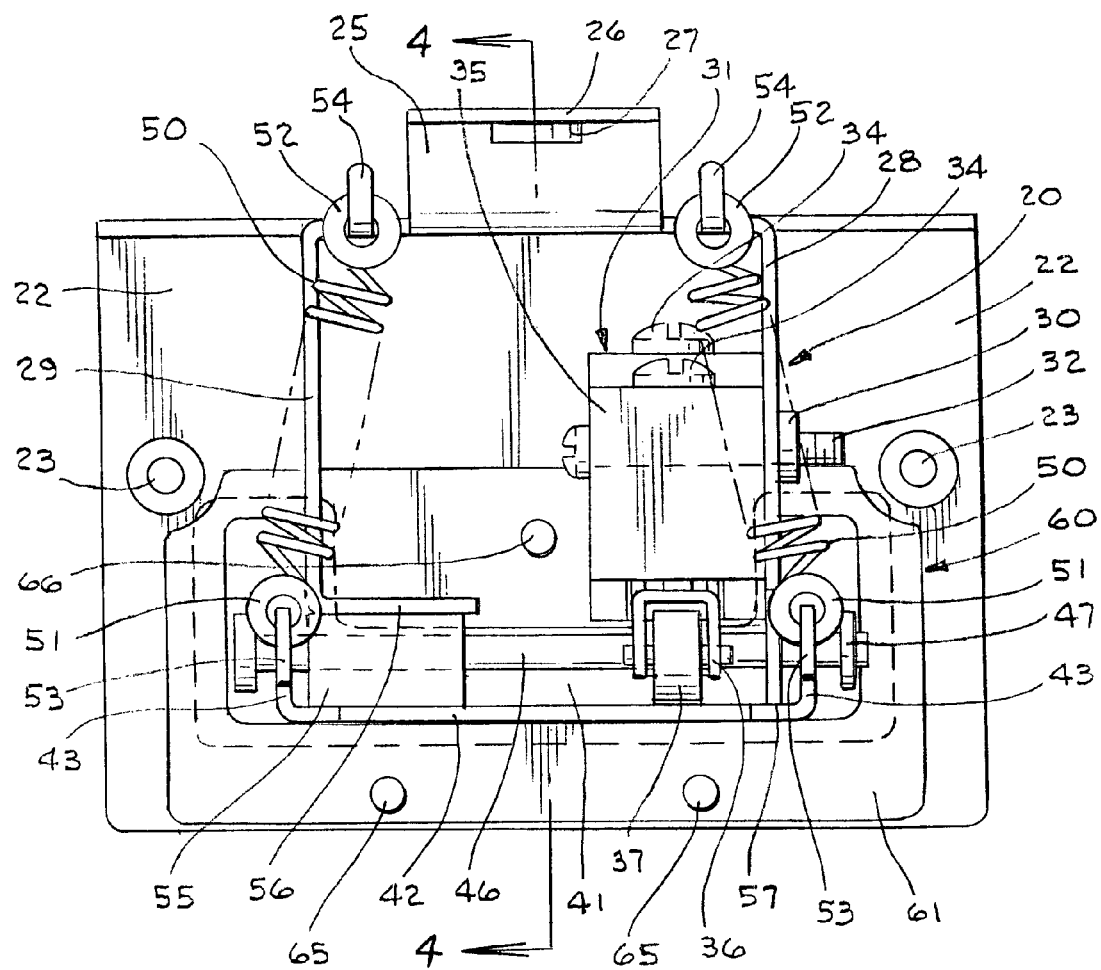
FIG. 3 is a top plan view of an assembled switch assembly of the present invention.
Figure 4:
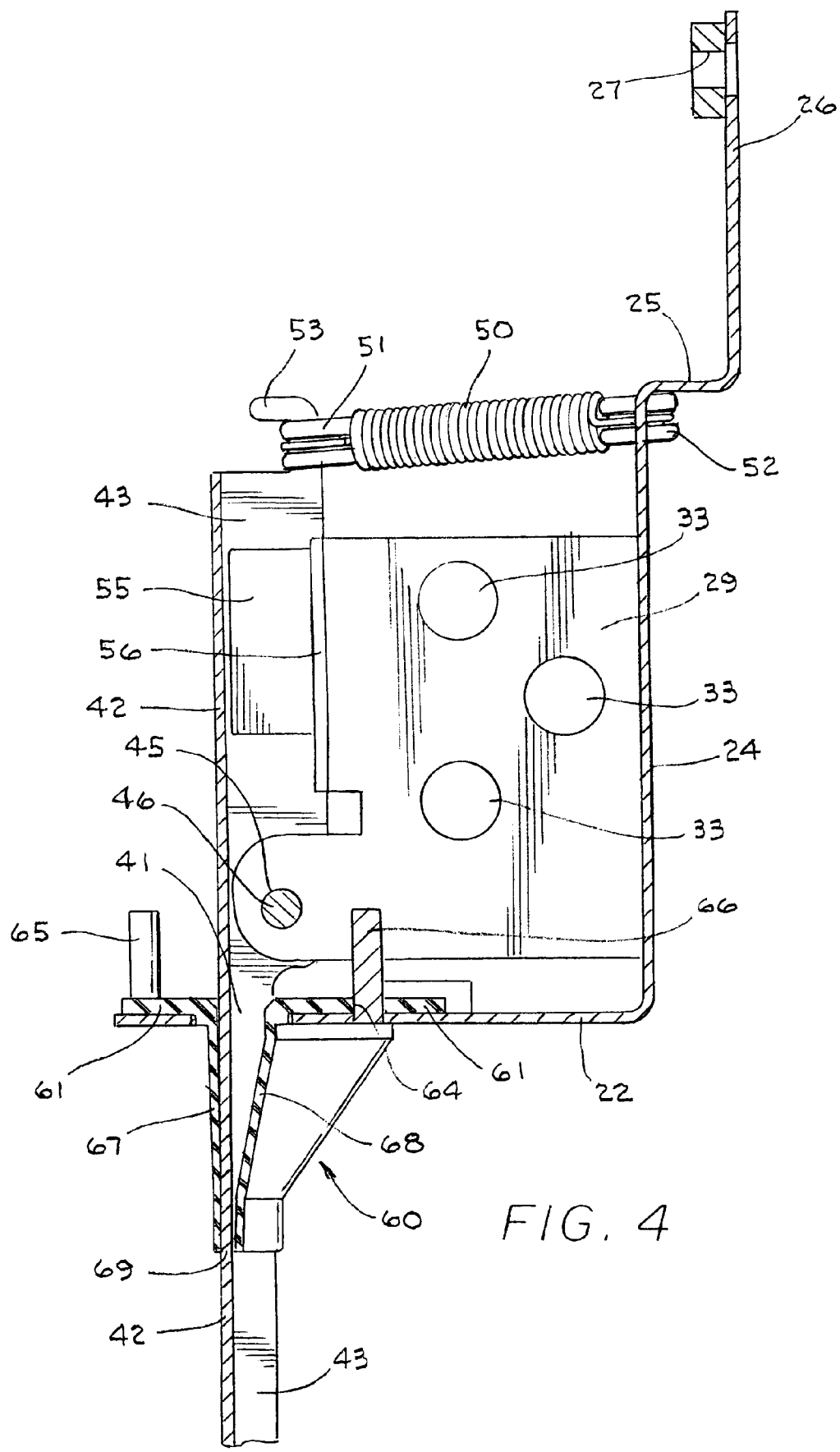
FIG. 4 is a sectional view taken substantially along line 4-4 of FIG. 3.
Figure 5:
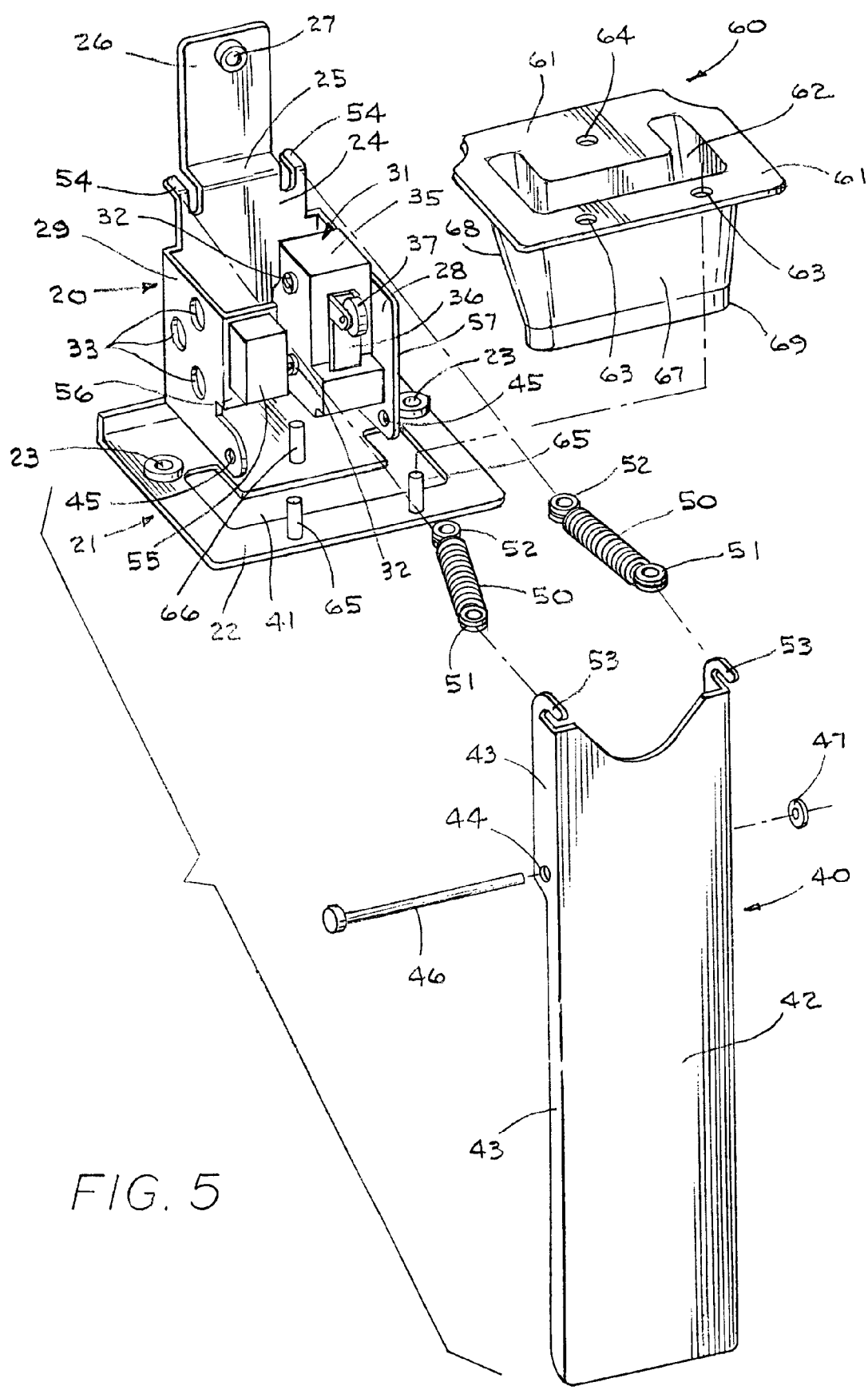
FIG. 5 is an exploded perspective view of the switch assembly shown in FIG. 3.

Bracket 21 also includes opposed sidewalls 28, 29 extending forwardly from lower back wall 24 and extending over base plate 22. Wall 28 includes apertures 30 which allow a switch, generally indicated by the numeral 31, to be attached to bracket 21 with suitable fasteners 32. Wall 29 includes a plurality of holes 33 which provide for the passage of electrical wires (not shown) to and from switch 31. For example, power wires may extend from on-off switch 19 through holes 33 to switch 31 and then operating wires may extend from switch 31 through holes 33 to the motor which rotates agitator 15. These wires are connected to switch 31 as by terminals 34 (FIG. 3).

Switch 31 may be a conventional item such as Model No. GPTCRM11 of Cherry Corporation of Pleasant Prairie, Wis. Thus, as one skilled in the art and familiar with such switches would know, switch 31 includes a body portion 35 having a rocker arm 36 which is biased outwardly therefrom. Arm 36 is provided with a roller 37 which is positioned to be engaged by a lever paddle generally indicated by the numeral 40.

Paddle 40 is an elongate member which is pivotally attached to bracket 21 and which extends downwardly through a U-shaped, slot-like aperture 41 in base plate 22 of bracket 21 and into mixing chamber 17 adjacent to agitator 15. Paddle 40 includes a wide face plate 42 having opposed edges 43 extending rearwardly therefrom. Edges 43 are provided with aligned apertures 44 which are aligned with opposed apertures 45 formed in bracket sidewalls 28 and 29. A pin 46 extends through apertures 44 and apertures 45 and is held in place by a retaining ring 47. As such, paddle 40 is pivotable within bracket aperture 41 on an axis defined by pin 46.

Plate 42 is maintained biased against roller 37 of switch 31 by springs 50 which are provided with eyelets 51 and 52 on the ends thereof. A hook 53 is formed on top of each edge 43 of plate 42 to receive and engage eyelets 51 of each spring 50, and hooks 54 are formed in back wall 24 of bracket 21 to receive and engage eyelets 52 of each spring 50. As such, plate 42 bears against roller 37 of switch arm 36 maintaining arm 36 in a direction toward switch body 35 and thereby maintains switch 31 open. Springs 50 also urge plate 42 to contact a pad 55, preferably made of a foam or similar material, which is carried by a tab 56 formed on bracket side wall 29.

A flexible boot, generally indicated by the numeral 60, may be provided to prevent food materials from splashing upward and contaminating switch assembly 20. Boot 60 may be formed of any rubber-like material, such as sanoprene, and includes a top surface 61 having a slot-like aperture 62 therein. Aperture 62 is shown as being generally U-shaped and, as such, generally corresponds to the shape of aperture 41 in bracket 21. The top surface 61 of boot 60 is provided with two apertures 63 formed on one side of aperture 62, and one aperture 64 formed on the other side of aperture 62. Apertures 63 are received on posts 65 which extends upwardly from base plate 22 of bracket 21, and aperture 64 is received on post 66 which also extends upwardly from bracket base plate 22. As such, bracket 21 carries boot 60.

Boot 60 includes a front wall 67 extending generally, vertically downwardly from top surface 61 at the front edge of aperture 62, and a back wall 68 which extends angularly downwardly from the top surface 61 at the rear edge of aperture 62. Walls 67 and 68 extend through bracket aperture 41 and meet at the bottom thereof, as at 69, to resiliently engage paddle plate 42 therebetween. As such, food in the form of liquids or the like cannot pass the point 69 engagement of boot 60 with paddle plate 42.

When machine 10 is in its normal nonoperating condition, plate 42 thus maintains switch 31 open so that no power is provided to the motor which rotates agitator 15. This condition is shown in FIG. 3. When the user wishes to mix a food product in a cup C, he raises the cup so that the agitator 15 is within cup C and the contents thereof, as shown in FIG. 1. Then one edge of cup C or the hand of the user may be pressed against plate 42 which is an easy procedure particularly in that plate 42 is quite wide. Such action pivots plate 42 on pin 46 as the bias of springs 50 is overcome. When plate 42 is so pivoted, back wall 68 of boot 60 flexes. This pivoting movement of plate 42 moves the top of plate 42 away from switch roller 37 allowing the bias on rocker arm 36 to pivot rocker arm 36 away from switch body 35 closing switch 31 to operate the motor to rotate agitator 15 thereby mixing the food product. When the user is satisfied that the product is sufficiently blended, the pressure against plate 42 may be removed causing plate 42 to pivot back to the FIG. 3 position. By so doing, plate 42 will contact foam 55 which will deaden any sound that might otherwise be associated with the return of plate 42 to the FIG. 3 position under the force of springs 50. However, in order to protect switch arm 36 from any undue return force, plate 42 will engage the edge 57 of bracket side wall 28 so that switch 31 is not over-stressed in the open position. Thus, switch 31 is thereby protected from damage if the return force of springs 50 would happen to be too great.

In view of the foregoing, it should be evident that a switch assembly 20 constructed and operated as described herein accomplishes the objects of the present invention and substantially improves the art.

What is claimed is:

1. A machine for mixing food in a cup comprising a housing; an agitator assembly depending downwardly for a length from said housing and adapted to be rotated to mix food when said agitator assembly is positioned in the cup; and a switch assembly; said switch assembly including a bracket in said housing, an elongate member pivotally carried by said bracket, a pivot axis defined on said bracket about which said elongate member pivots, said elongate member extending downwardly from said pivot axis adjacent to a substantial portion of said length of said agitator assembly, a switch carried by said bracket and movable between open and closed positions, and means to bias said elongate member toward said switch, such that when in the closed position said agitator assembly can be rotated, said elongate member engaging said switch such that when said elongate member is pivoted, said switch moves from the open to the closed position.

2. The machine of claim 1 further comprising a pad carried by said bracket, said elongate member engaging said pad when biased toward said switch.

3. The machine of claim 1 wherein said means to bias includes at least one spring extending between one end of said elongate member and said bracket, the other end of said elongate member being positioned adjacent to said agitator assembly.

4. The machine of claim 3 wherein said bracket includes at least one hook to engage one end of said at least one spring, and said one end of said elongate member includes at least one hook to engage the other end of said at least one spring.

5. The machine of claim 1 further comprising a pin connecting said elongate member to said bracket, said pin defining said pivot axis of said elongate member relative to said bracket.

6. The machine of claim 1 further comprising a flexible boot carried by said bracket, said boot protecting said switch from contamination from food being mixed in the cup.

7. The machine of claim 1 wherein said elongate member is a plate.

8. The machine of claim 1 wherein said bracket has an opening and said elongate member extends through said opening.

9. A machine for mixing food in a cup comprising a housing; an agitator assembly depending downwardly for a length from said housing and adapted to be rotated to mix food when said agitator assembly is positioned in the cup; and a switch assembly; said switch assembly including a bracket in said housing, an elongate member pivotally carried by said bracket, a pivot axis defined on said bracket about which said elongate member pivots, said elongate member extending downwardly from said pivot axis adjacent to a substantial portion of said length of said agitator assembly, and a switch carried by a wall of said bracket and movable between open and closed positions, such that when in the closed position said agitator assembly can be rotated, said elongate member engaging said switch such that when said elongate member is pivoted, said switch moves from the open to the closed position, said wall of said bracket being engaged by said elongate member to prevent said elongate member from over-engaging said switch.

10. A machine for mixing food in a cup comprising a housing; an agitator assembly depending downwardly for a length from said housing and adapted to be rotated to mix food when said agitator assembly is positioned in the cup; and a switch assembly; said switch assembly including a bracket in said housing, an elongate member pivotally carried by said bracket and extending downwardly adjacent to said agitator assembly, and a switch carried by said bracket and movable between open and closed positions, such that when in the closed position said agitator assembly can be rotated, said plate engaging said switch such that when said plate is pivoted, said switch moves from the open to the closed position, wherein said bracket includes a first wall carrying said switch and a second wall opposed to said first wall, said first wall being engaged by said plate to prevent said plate from over-engaging said switch, and said second wall having holes therein adapted to allow wires from said switch to pass therethrough.

11. A machine for mixing food in a cup comprising a housing; an agitator assembly depending downwardly for a length from said housing and adapted to be rotated to mix food when said agitator assembly is positioned in the cup; and a switch assembly; said switch assembly including a bracket in said housing, an elongate member pivotally carried by said bracket, a pivot axis defined on said bracket about which said elongate member pivots, said elongate member extending downwardly from said pivot axis adjacent to a substantial portion of said length of said agitator assembly, and a switch carried by said bracket and movable between open and closed positions, said switch including a pivotable arm biased outwardly toward said elongate member, said elongate member being biased to engage said arm, such that when in the closed position said agitator assembly can be rotated, said elongate member engaging said switch such that when said elongate member is pivoted, said switch moves from the open to the closed position.

12. The machine of claim 11 wherein said bracket includes a wall which engages said elongate member against the bias thereof to protect said arm of said switch.

13. A machine for mixing food in a cup comprising a housing; an agitator assembly depending downwardly from said housing and adapted to be rotated to mix food when said agitator assembly is positioned in the cup; and a switch assembly; said switch assembly including a bracket in said housing, a plate pivotally carried by said bracket and extending downwardly adjacent to said agitator assembly, and a switch carried by said bracket and movable between open and closed positions, such that when in the closed position said agitator assembly can be rotated, said plate engaging said switch such that when said plate is pivoted, said switch moves from the open to the closed position; a flexible boot carried by said bracket; pegs carried by said bracket and apertures formed in said boot, said pegs being received through said apertures so that said bracket carries said boot, said boot protecting said switch from contamination from food being mixed in the cup.

14. A machine for mixing food in a cup comprising a housing; an agitator assembly depending downwardly from said housing and adapted to be rotated to mix food when said agitator assembly is positioned in the cup; and a switch assembly; said switch assembly including a bracket in said housing, a plate pivotally carried by said bracket and extending downwardly adjacent to said agitator assembly, and a switch carried by said bracket and movable between open and closed positions, such that when in the closed position said agitator assembly can be rotated, said plate engaging said switch such that when said plate is pivoted, said switch moves from the open to the closed position, said machine further comprising a flexible boot carried by said bracket, wherein said boot includes opposed walls having ends meeting at a point, said plate being positioned between said walls such that when said plate is pivoted, said walls separate at said point, said boot protecting said switch from contamination from food being mixed in the cup.

* * * * *